United States Patent

[11] 3,607,145

| [72] | Inventor | Donald A. Wenz |
| --- | --- | --- |
| | | Downers Grove, Ill. |
| [21] | Appl. No. | 789,359 |
| [22] | Filed | Jan. 6, 1969 |
| [45] | Patented | Sept. 21, 1971 |
| [73] | Assignee | The United States of America as represented by the United States Atomic Energy Commission |

[54] PLUTONIUM SEPARATION FROM URANIUM
6 Claims, No Drawings

[52] U.S. Cl. ..................................................... 23/325, 23/333, 23/355, 75/84.1
[51] Int. Cl. ........................................... C01g 56/00, C01g 57/00, C22b 61/04
[50] Field of Search ............................................ 75/84.1, 84.1 A; 23/325, 333, 355; 252/301.1

[56] References Cited
UNITED STATES PATENTS

| 3,282,681 | 11/1966 | Knighton et al. | 75/84.1 |
| --- | --- | --- | --- |
| 3,284,190 | 11/1966 | Knighton et al. | 75/84.1 |
| 3,326,673 | 6/1967 | Knighton et al. | 75/84.1 |

Primary Examiner—Carl D. Quarforth
Assistant Examiner—R. L. Tate
Attorney—Roland A. Anderson

ABSTRACT: Plutonium dioxide is more soluble in molten magnesium chloride than is uranium dioxide. Separation of plutonium from a mixture of plutonium dioxide and uranium oxides is accomplished by dissolving the plutonium dioxide from the mixture with magnesium chloride and separating the undissolved uranium oxides.

PLUTONIUM SEPARATION FROM URANIUM

CONTRACTUAL ORIGIN OF THE INVENTION

The invention described herein was made in the course of, or under, a contract with the United States Atomic Energy Commission.

BACKGROUND OF THE INVENTION

There are a number of methods for reprocessing thermal nuclear fuel; see Reactor Handbook, Second Edition, Vol II, Fuel Reprocessing. The most common aqueous process is one which uses nitric acid to dissolve the fuel and various organic and inorganic solvents to separate the contained plutonium values from the uranium and fission product values. The principal problem in the aqueous process is the breakdown of organic solvents upon exposure to radiation. It is contemplated that fast breeder reactor fuels will have greater burnups than thermal fuels, hence higher radiation levels than the fuels now being reprocessed. The disintegration of organic solvents used in the aqueous process is not likely to be alleviated but rather intensified during reprocessing of fast breeder fuels. Pyrochemical reprocessing of fast breeder fuels is an attractive alternative to aqueous reprocessing for several reasons, one of which is the use of materials that are not seriously degraded by exposure to intense radiation.

Pyrochemical reprocessing of fast breeder fuels has been under investigation at the Argonne National Laboratory for several years. In general, the Argonne process involves reducing oxide fuels in molten metal alloys to the free metal. Thereafter, the molten metal alloy which contains the free-metal fuel is contacted with a molten salt which oxidizes the free-metal fuel and effects a transfer of the fuel from the alloy to the salt. The salt containing the fuel is then contacted with various other alloy combinations which by means of their different affinities with respect to each element in the fuel effects a separation of uranium from plutonium from the various fission products. Various parts of the above-mentioned process are disclosed in U.S. Pat. Nos. 3,282,681 and 3,326,673 assigned to the U.S. Atomic Energy Commission by J. B. Knighton et al. These patents have at least one step in common, that is, the reduction of the oxidic fuel to the free metal with a molten alloy.

It has been discovered that a rough separation of uranium and plutonium oxides may be directly effected by preferential dissolution of one of the oxides in a salt without the need for prior reduction by a molten alloy. It has been shown that plutonium dioxide has a large solubility in magnesium chloride while uranium dioxide does not. The principal reaction by which the separation occurs is set out below:

$$UO_2(s)+PuO_2(s)+MgCl_2(l) = PuOCl(l)+MgO(s)+\tfrac{1}{2}MCl_2(g)+UO_2(s) \quad (1)$$

As may be seen by the above reaction, $PuO_2$ is reduced to form $PuOCl$ which is soluble in the liquid magnesium chloride; $UO_2$ and $MgO$ are solids, and chlorine gas is produced. By adding a reducing agent which removes the chlorine gas as it is produced, the reaction is driven to the right, as follows:

$$UO_2(s)+PuO_2(s)+MgCl_2(l)+M(l) = PuOCl(l)+MgO(s)+MCl(l)+UO_2(s) \quad (2)$$

It has been found that tantalum and zinc are superior reducing agents and that vigorous mixing improves the dissolution rate of the plutonium in the salt. It has been further found that plutonium dioxide dissolves rather slowly from combinations of uranium dioxide and plutonium dioxide, while plutonium dioxide dissolves much more quickly from combinations of $U_3O_8$ and plutonium dioxide. It is believed that the reason for this phenomenon is that $U_3O_8$ initially reacts with magnesium chloride to produce a soluble species which thereafter reacts to produce insoluble uranium dioxide. The following sequence of reactions explains the experimentally observed presence of high initial concentrations of uranium in the salt followed by precipitation of uranium dioxide from the slat.

$$U_3O_8(s)+4Cl^- = UO_2Cl_2(l)+2UO_2Cl(l)+2O^{2-} \quad (3)$$
$$UO_2Cl_2(l) = UO_2Cl(l)+\tfrac{1}{2}Cl_2(g) \quad (4)$$
$$UO_2Cl(l) = UO_2(s)+\tfrac{1}{2}Cl_2(g) \quad (5)$$

The following experiments will show the effect of different variables on the reduction and dissolution rate of the plutonium dioxide in magnesium chloride and magnesium-chloride-containing salts.

Various salts were charged to alumina crucibles and either uranium dioxide, $U_3O_8$ or plutonium dioxide was then added to the crucible. The contents were stirred with quartz stirrers and samples removed with tantalum filters and tubes. With reference to Table I, the uranium concentrations in the salt in contact with $U_3O_8$ are given for the first sample taken at 60 minutes, because the uranium concentrations dropped to low values in the later samples; see reactions 3-5. Microscopic and X-ray examinations showed that the solid phase in equilibrium with the salts after the experiments was only uranium dioxide. while from Table I it is seen that $U_3O_8$ dissolves to give high initial concentrations of uranium in the salt. Table I shows the solubility of uranium dioxide, $U_3O_8$, and plutonium dioxide in various salts and the effect on oxide solubility of an addition of magnesium fluoride. The plutonium dioxide data show that there are very high plutonium concentrations in the magnesium-chloride-containing salts in equilibrium with the plutonium dioxide with respect to the concentrations of uranium dioxide in the salts. The plutonium solubility limit was not obtained for the $NaCl-KCl-MgCl_2$ and the $CaCl_2-MgCl_2$ salts, because not enough plutonium dioxide was used. The effect of the magnesium fluoride addition was checked in the following experiments.

TABLE I

| Salt composition (m/o) | Metal conc. in salt (w/o) | | |
|---|---|---|---|
| | $UO_2$ | $U_3O_8$[a] | $PuO_2$ |
| 100 $MgCl_2$ | 0.029 | 1.0 | 1.3 |
| Above plus 5 $MgF_2$ | 0.015 | | 1.8 |
| 50 $MgCl_2$-30 NaCl-20 KCl | 0.023 | 0.4 | [b] >4.3 |
| Above plus 5 $MgF_2$ | 0.015 | | [b] >4.3 |
| 50 $MgCl_2$-50 $CaCl_2$ | 0.025 | 0.4 | [b] >4.3 |
| Above plus 5 $MgF_2$ | 0.014 | 0.4 | [b] >4.3 |
| 59 LiCl-41 KCl | 0.005 | 0.2 | 0.012 |
| Above plus 5 $MgF_2$ | 0.003 | | 0.27 |

[a] After 60 min. contact with salt.
[b] Theoretical maximum from amount of $PuO_2$ added.

In this series of experiments magnesium fluoride was added to the magnesium chloride salts to determine what effect if any fluoride addition had on the plutonium solubility in the salt. Plutonium dioxide and the salt without magnesium fluoride were mixed for about 20 hours; then, magnesium fluoride was added and the salts mixed for approximately 6 hours. The crucibles were alumina, the stirrers were tantalum and the salt-oxide mixture was maintained at 800° C. under helium. As seen in Table II, samples taken with tantalum tubes and filters showed that within analytical error the addition of magnesium fluoride did not affect the plutonium concentration in the salts containing magnesium chloride.

TABLE II

| Salt Composition, m/o | Plutonium Concentration, w/o |
|---|---|
| 50 $MgCl_2$-50 $CaCl_2$ (I) | 6.5 |
| I + 5 $MgF_2$ | 6.5 |
| 50 $MgCl_2$-30 NaCl-20 KCl (II) | 5.0 |
| II + 5 $MgF_2$ | 5.0 |
| 100 $MgCl_2$ (III) | 1.3[a] |
| III + 5 $MgF_2$ | 1.8 |
| 59 LiCl-41 KCl (IV) | 0.012 |
| IV + 5 $MgF_2$ | 0.27 |

[a] Probably low due to short equilibration time.

Plutonium dioxide is far more easily dissolved in magnesium chloride salts when the plutonium dioxide is contained within a $U_3O_8$ matrix than when it is contained within a uranium dioxide matrix. Experiments were performed in which sintered uranium dioxide –20 w/o plutonium dioxide pellets were subdivided into small pieces several millimeters in size and contacted with a 47.5 m/o $CaCl_2$-47.5 m/o $MgCl_2$-5 m/o $MgF_2$ salt maintained at 800° C. The salt was stirred and maintained at the aforementioned temperature for 18 hours, thereafter it was raised to 875° C. for 2 hours and lowered to 800° C. for several more hours. The final average plutonium concentration of 1.15 percent was well below the 5.2 percent theoretical concentration if all the plutonium dioxide added had dissolved. The uranium average concentration of $4.5 \times 10^{13}$ percent was also below the equilibrium concentration of $1.5 \times 10^{12}$ percent for uranium dioxide.

An experiment similar to those last described was performed, except that the sintered solid solution of uranium dioxide -20 m/o plutonium dioxide pellets was oxidized in air at 800° C. to a composition approximately 80 m/o $UO_{2.6}$ -20 m/o $PuO_2$. A 5.17 gram portion of the above material was placed with 93 grams of NaCl-KCl-$MgCl_2$ eutectic in a baffled tantalum crucible in a furnace. It was heated to 800° C. under helium and then stirred at 500 r.p.m. with a tantalum stirrer. Samples taken after 6 and 22 hours showed that 42 and 71 w/o, respectively, of the plutonium was dissolved in the salt. About 0.6 w/o of the uranium present was dissolved in the salt at the end of the experiment. The above experiments show the difference in the extent and rate of plutonium dioxide reduction and dissolution in magnesium-chloride-containing salts when the plutonium dioxide is contained in a uranium dioxide matrix or in a $U_2O_8$ matrix.

The following experiments show the effect of various reducing agents on the extent and rate of dissolution of plutonium in magnesium-chloride-containing salts. The free energy of reaction (1) at 1,000° K. is about +23 kilocalories, while the free energy for reaction (2) is −8 when M is tantalum, −12 when M is zinc and −4 when M is lead at 1,000° K. Therefore, reaction (2) should proceed more nearly to completion when M is zinc than when M is any of the other named reducing agents.

Table III shows the effect of adding a reducing agent to reaction (1), as well as the effect on reaction (2) of various reducing agents. The salts were maintained at 800° C. and stirred at about 500 r.p.m. during the time the experiments were being conducted. If the reductant was tantalum, then tantalum crucibles and stirrers were used; if the reductant was lead or zinc, then quartz crucibles and stirrers were used.

TABLE III

| Run | Salt composition | Wt., g. | Wt. of Pu in $PuO_2$ added, g. | Reductant | Time, hr. | Percent of Pu in salt |
| --- | --- | --- | --- | --- | --- | --- |
| PMR-1 | 50 $MgCl_2$-30 NaCl-20 KCl | 79 | 4.5 | None | 6 | 11 |
| PMR-2 | 50 $MgCl_2$-30 NaCl-20 KC | 100 | 4.5 | Pb | 7 | 21 |
| PMR-3 | 50 $MgCl_2$-30 NaCl-20 KCl | 140 | 4.3 | Ta | 6 | 99 |
| PMR-4 | $MgCl_2$ | 83 | 4.2 | Zn | 4 | 84 |
|  |  |  |  |  | 20 | 94 |

A final experiment was performed similar to run No. 3 in Table III in which a solid solution of uranium dioxide-20 w/o plutonium dioxide was oxidized to $U_3O_8$-plutonium dioxide and contacted with 142 grams of magnesium chloride maintained at 800° C. in a baffled tantalum crucible. The mixture was stirred at 800 r.p.m. After 6 hours approximately 90 percent of the plutonium was in the salt and after 22 hours approximately 95 percent of the plutonium was in the salt, while only 4 percent of the uranium dissolved. It is therefore clear that the above-described process produces a separation of plutonium from uranium.

It will be understood that the invention is not to be limited to the details given herein but that it may be modified within the scope of the appended claims.

The embodiments of the invention in which an exclusive property or privilege is claimed are defined as follows:

1. A process for the separation of uranium from mixed oxides of uranium and plutonium comprising introducing the mixed oxides into molten magnesium chloride whereby the plutonium oxides are reduced to plutonium oxychloride (PuOCl) and dissolved in the magnesium chloride while uranium dioxide precipitates therefrom.

2. The process of claim 1 wherein chlorine generated during said reduction of the plutonium oxides is removed as it is formed.

3. The process of claim 1 wherein the uranium oxide is primarily $U_3O_8$.

4. The process of claim 2 wherein the chlorine is removed by reaction with a reducing agent present in the magnesium chloride solution.

5. The process of claim 4 wherein the reducing agent is zinc or tantalum.

6. The process of claim 4 wherein the salt and oxides are maintained at about 800° C. and are continuously mixed during contact.

UNITED STATES PATENT OFFICE
CERTIFICATE OF CORRECTION

Patent No. 3,607,145          Dated September 21, 1971

Inventor(s) Donald A. Wenz

It is certified that error appears in the above-identified patent and that said Letters Patent are hereby corrected as shown below:

In column 1, lines 51-52, change "$1/2MCl_2(g)+UO_2(S)$" to --$1/2Cl_2(g)+UO_2(S)$--.

line 72, change "slat" to --salt--.

equation (3), change "$+4Cl^{(1)}$" and "$+2O^{12}$" to --$+4Cl^-$-- and --$+2O^{-2}$--.

In column 3, line 24, change "$10^{13}$" to --$10^{-3}$--.

line 25, change "$10^{12}$" to --$10^{-2}$--.

line 42, change "$U_2O_8$" to --$U_3O_8$--.

Signed and sealed this 9th day of May 1972.

(SEAL)
Attest:

EDWARD M. FLETCHER, JR.
Attesting Officer

ROBERT GOTTSCHALK
Commissioner of Patents